Oct. 27, 1964   F. J. LUKETA   3,153,829
HOOK AND EYE

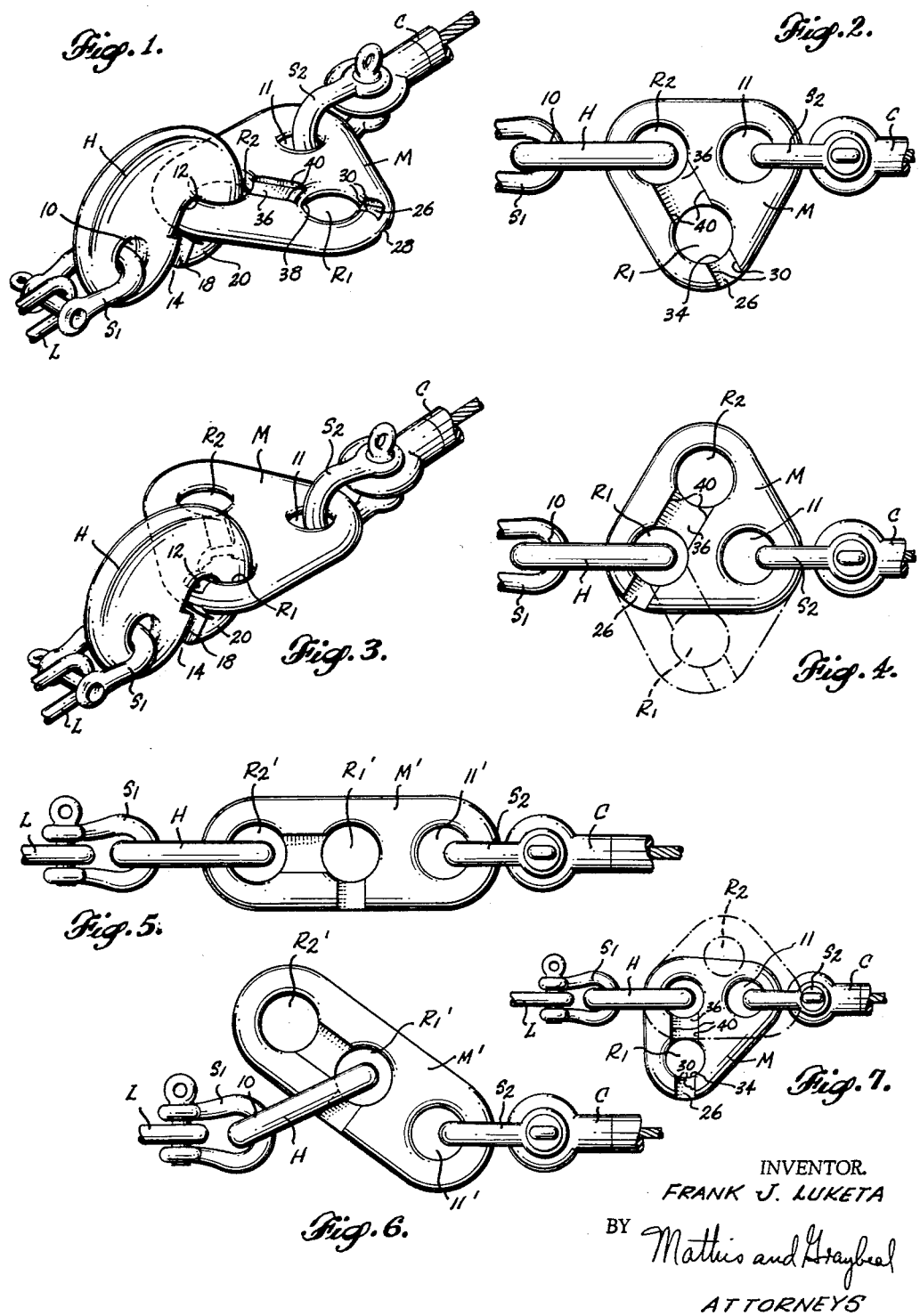

Filed Feb. 18, 1963   3 Sheets-Sheet 2

INVENTOR.
FRANK J. LUKETA
BY Mathis and Graybeal
ATTORNEYS

Oct. 27, 1964 F. J. LUKETA 3,153,829
HOOK AND EYE

Filed Feb. 18, 1963 3 Sheets-Sheet 3

INVENTOR.
FRANK J. LUKETA
BY Mathis and Graybeal
ATTORNEYS

United States Patent Office 3,153,829
Patented Oct. 27, 1964

3,153,829
HOOK AND EYE
Frank J. Luketa, 5567 Greenwood Ave. N.,
Seattle 3, Wash.
Filed Feb. 18, 1963, Ser. No. 258,980
10 Claims. (Cl. 24—201)

This application discloses subject matter present in my abandoned application Serial No. 134,038, filed August 14, 1961, and entitled G Hook Eye Ring Couplers, and superseded by my continuation-in-part application Serial No. 259,453, entitled G Hook and Associated Coupling Means.

The present invention relates to hook and ring coupling means of the engageable-disengageable type wherein an eye ring segment of reduced dimension fits into the point-to-shoulder throat of a hook for connection and disconnection of the hook from the eye ring. More particularly, the present invention relates to an improved form of eye ring for use with the G-hook disclosed and claimed in aforementioned application Serial No. 259,453, and also to the improved coupling formed by the combination of such eye ring with said G-hook. Although capable of various usages, the improved coupling of the present invention is primarily intended for use in installations involving line-to-line connections.

The eye ring form of the present invention comprises a multiple-ring member characterized by an eye portion for the reception and accommodation of a clevis or the like, used to secure the multiple-ring member to a line, and a plurality of ring portions for selective reception and accommodation of the G-hook, with two such ring portions being preferred. The ring portions are situated in different radial directions from said eye portion. A first of said ring portions has an outboard access segment dimensioned to snugly interfit the throat of the hook, and said ring member further includes an access segment extending between each adjacent ring portion, and each additional access segment is also dimensioned to snugly interfit the hook throat. The unique construction of the multiple-ring member of the present invention assures that hook-to-ring contact is made within the line of pull, regardless of which ring portion the hook is engaged in. The significance of this feature is that because of it the hook and the eye member are not subjected to a lateral bending moment tending to alter their respective shapes, as would be the case if the hook-to-ring contact occurred at a location laterally offset to one side or the other of the line of pull.

Application of hook and eye couplers according to the present invention can be made, for example, as engageable-disengageable components of a trawl net gear, such as disclosed in my copending application Serial No. 269,691, filed April 1, 1963, and entitled Drum Trawling Method and Apparatus, particular reference being made to hooks 34 and eyes 93 as well as hooks 13 and eyes 37 of the trawl net gear disclosed in said application to implement the hauling method. The said application Serial No. 269,691 is a continuation of my prior application Serial No. 132,234 which is in turn a continuation of my prior application Serial No. 570,771, filed March 12, 1956, both prior applications now abandoned.

As will be apparent, however, such hook and ring coupler means of the engageable-disengageable type are usable as well as many and wider varied applications wherein engagement or disengagement of a hook with a ring by precise manipulation of the hook is desired, and wherein the coupler in use is to be guarded against inadvertent disengagement of the hook and ring. Conventional G-hooks and rings, as used in the fishing industry for example, have an eye ring with one or two reduced diameter access segments, or escape "flats" to accommodate the spacing or throat between the hook point and the hook base or shoulder. In conventional design, the ring access segment and the configuration of the hook and the hook shoulder and hook point are of generally tapered contour. On an occasion where a hook throat happens to fall near the reduced diameter or flat area of the ring, the engaging surface being of tapered contour often tends to guide the hook throat into alignment with the ring flat and cause inadvertent disengagement.

In order to obviate such inadvertent disengagement, the hook and ring coupler of the present invention utilizes squarely oriented hook throat and ring surfaces in the area of the access segment of the ring. More particularly, the ring access segment and the hook throat are each configured to have snugly interfitting, substantially right angularly related access surfaces intersecting a plane across the direction of coupling movement thereof and the hook is also configured to have lock surfaces of substantial area, which lock surfaces are each situated substantially at right angles to one of said access surfaces. The lock surfaces of the hook prevent any camming action of the access segment of the ring to the hook throat and thus prevent inadvertent disengagement of the hook from the ring, such disengagement being prevented except when a precise orientation of the hook throat with the ring access segment is established.

The multiple-ring arrangement provides an additional safeguard against inadvertent disengagement of the hook from the ring member when the hook is engaged in a ring portion other than the ring portion having the outboard access segment. In such situation the hook can be disconnected from the ring member only by movement of the hook throat past at least two access segments. Thus, the multiple-ring arrangement with the hook engaged within an inside ring portion provides what may be termed a two-stage locking arrangement insuring that the hook and ring member do not inadvertently disengage during use.

In one form of the invention the multiple-ring member is provided with but two ring portions, and such ring portions and the eye portion define between them a triangle, the shape of which is not critical, i.e. it can be an equilateral triangle, a right angled triangle, or an isosceles triangle, for example. In this form of the invention a first access segment is provided outboard of one of the ring portions, and a second access segment is provided between the first and second ring portions, with each such access segment being dimensioned to snugly interfit in and present substantially right angularly related surfaces to the side surfaces of the hook throat, and with the direction of movement of said hook throat into disengagement with the first ring portion being related substantially at right angles to the direction of movement of said hook for engagement or disengagement thereof into or out of said second ring portion. Other forms of the multiple-ring member include a form characterized by three or more ring openings spaced equal distances apart along an arc opening towards the eye portion. Alternatively, the three or more ring portions may be spaced apart along a straight line laterally offset from said eye portion.

These and other objects, features, and advantages and characteristics of engageable-disengageable hook and ring couplers according to the present invention will be apparent from the following typical and therefore non-limitative embodiments of such coupler as discussed below, in conjunction with the accompanying illustrations thereof, wherein like letters and numerals refer to like parts, and wherein:

FIG. 1 is a perspective view of a hook and ring coupling according to the invention, showing the hook engaged in use position within the second ring portion of a multiple ring member of the double-ring type;

FIG. 2 is a top plan view of the form of coupling shown in FIG. 1, such view also showing the hook engaged within the second ring portion;

FIG. 3 is a perspective view of the hook and ring coupling of FIG. 1, but showing the hook engaged in use position within the first ring portion;

FIG. 4 is a top plan view of the arrangement of FIG. 3, and in addition showing in broken line the hook engaged in use position within the second ring portion, such view serving to show that both ring portions occupy a position within the line of pull when engaging the hook;

Figure 9:
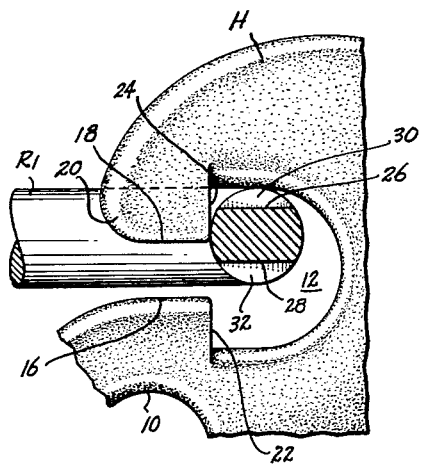
Figure 8:
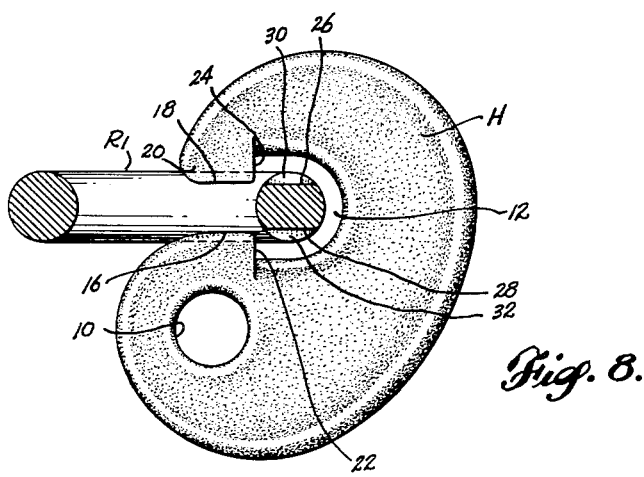
Figure 10:
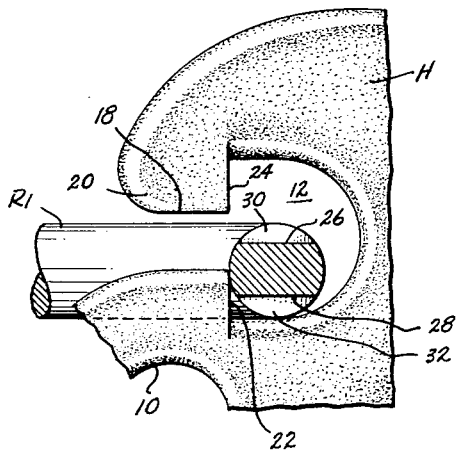
Figure 11:
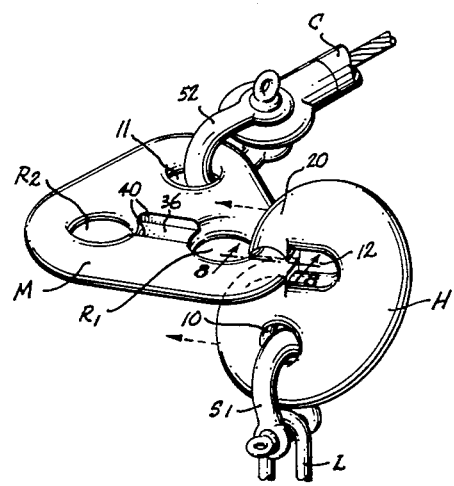
Figure 12:
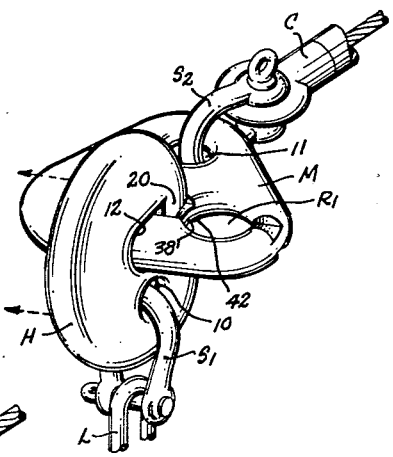
Figure 13:
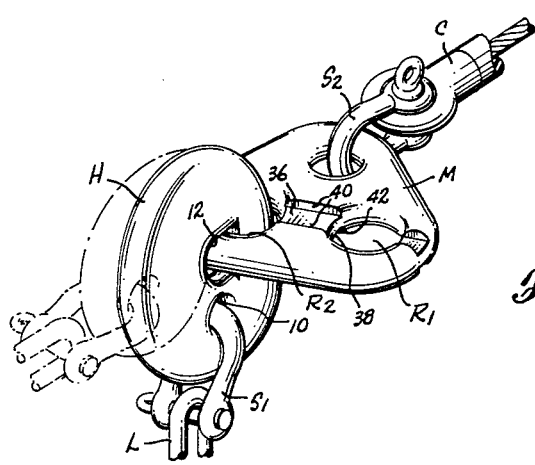

FIG. 5 is a view of a modified form of hook and ring coupler, not forming a part of the instant invention, but rather being the subject of a copending application, and being included herein together with FIG. 6 to illustrate better one of the advantageous features of the coupling of the present invention, the hook being shown in its use position within the outboard ring portion of an elongated double-ring member;

FIG. 6 is a view similar to the view of FIG. 5, but showing the hook engaged within the inboard ring portion of the ring member, with such figure showing the deviation of the point of hook-to-ring contact from the line of pull when the hook of the present invention is employed with an elongated double-ring member and such hook is engaged within the inboard ring portion;

FIG. 7 is a view of a modified form of hook and ring coupling according to the present invention wherein the eye portion and the two ring portions are positioned on the respective corners of an imaginary right-angled triangle;

FIG. 8 is a view on an enlarged scale of the hook and a fragmentary portion of the eye ring shown in FIG. 1, with the ring and hook being shown in aligned, interfitting relation, and further serving to show the relation of the lock surfaces of the hook with an inner surface of the ring; and with relatively offset or locked positions thereof being shown by broken lines;

FIGS. 9 and 10 are views similar to FIG. 8, but showing the ring in relatively offset, i.e. locked, positions with respect to the ring throat, the view of FIG. 9 being with the ring in that portion of the inner hook area relatively near the hook point, and the view of FIG. 10 being with the ring in the opposite portion of the inner hook area;

FIG. 11 is a perspective view of the hook in access orientation with respect to the access segment leading into the first ring portion of the multiple-ring member;

FIG. 12 is a view of the hook in access orientation with respect to the access segment between the two ring portions of the multiple-ring member; and FIG. 13 is a perspective view showing in solid line the hook in the position that it occupies immediately after entering the second ring portion, and showing in broken lines the hook in use position within such second ring portion.

Turning to a specific consideration of the several figures of the drawings, the view of FIG. 1 is a view of a typical use of the hook and eye ring coupler of the present invention for joining a lazy line chain link L and the swaged end of a sweep line C, for example. In use, of course, one segment to be coupled, such as chain link L, is connected to the eye 10 of hook H by means of a clevis or shackle S1, for example. The other segment to be coupled, such as line C, is connected to the eye portion 11 of the ring member M, by a second clevis or shackle S2, for example. Ring portions R1 and R2 are integrally connected together and with eye portion 11, and these three portions together make up the ring member M.

In the form of the invention shown in FIGS. 1–4 and 11–13 the centers of the eye portion 11 and the ring portions R1 and R2 occupy the respective corners of an imaginary equilateral triangle and the overall shape of ring member M is substantially that of an equilateral triangle with rounded corners. Hook H includes an inner hook area 12 sized to loosely accommodate the ring portions R1, R2. Access of rings R1, R2 into area 12 of hook H is through the point-to-point shoulder hook throat, designated 14, which throat is defined by a shoulder surface 16 and a surface 18 of hook point 20. Also forming an integral and essential part of the ring receiving area 12 are shoulder lock surface 22 and point lock surface 24 (FIG. 8), which lock surfaces 22, 24 are of substantial area for reasons hereinafter discussed in detail in connection with the form of the invention shown in FIG. 8. The right angle relationship of throat surface 18 to lock surface 24 and the two parallel side surfaces of hook H define a generally square cornered or simply "square" hook point 20, and the right angle relationship of throat surface 16 to lock surface 22 and the parallel side surfaces of hook H give the hook shoulder a generally square cornered or "squared" shape or appearance.

As perhaps most clearly illustrated in FIGS. 1 and 8, the first access segment of ring R1 is configured to have respectively parallel inset surfaces 26, 28 of suitable thickness and of a width between respective end walls 30, 32 to snugly accommodate the hook throat 14, said end walls 30, 32 being arranged substantially at right angles to surfaces 26, 28 so as to also be in relatively snug relation to the side surfaces of the hook shoulder 16 and hook point 20 (note in particular FIG. 8) when the hook throat 14 is precisely aligned with said surfaces 26, 28, 30, 32. As most clearly shown in FIG. 8, during coupling and decoupling, the square cornered hook point snugly fits within one of the square cornered inset sections of the first access segment and the square cornered hook shoulder snugly fits within the second inset section.

Also important to the configuration of ring R1 is a somewhat arcuate inner surface 34 (FIG. 4) spanning the access segment of ring R1. Said surface 34 may be termed a ring lock surface.

Said ring lock surface 34 cooperates with hook shoulder lock surface 22 and hook point lock surface 24 in the manner portrayed at FIG. 8 to provide that disengaging movement of the hook H with respect to the ring R1 can occur only when the hook throat is in precise alignment with access surfaces 26, 28, 30, 32 of the ring. Otherwise, if there is misalignment such as shown in FIGS. 9 and 10, the lock surface 34 is in face-to-face, abutting relation with one or the other of the lock surfaces 22, 24 and prevents decoupling movement, and the substantially coplanar relation of hook lock surfaces 22, 24 minimizes the camming action found to be troublesome with hook and ring couplings of conventional design.

Manipulation of the hook H into normal use position within ring R2 requires that the hook throat first be installed on the ring by alignment of the throat with the access segment surfaces 26, 28, 30, 32 (as in FIG. 11). With the hook H thus installed on ring R1, the hook H is then moved circumferentially around ring R1 about 90°, at which point the hook H can be moved sideways into access engagement with a second access segment arranged between rings R1 and R2 (as shown in FIG. 12). Such second access segment is configured to present access surfaces 36, 38 with a thickness dimension therebetween only slightly smaller than the throat dimension of hook H, which access surfaces 36, 38 have associated therewith respective end walls 40, 42, the placement of said end walls 40, 42 being substantially as shown in FIG. 12 to at least in part snugly interfit and present substantially right angle related surfaces to the side surfaces of the hook point and shoulder.

As is apparent, the direction of movement of the hook throat into engagement or disengagement with ring portion R2 involves two-stage movement of the hook with the hook oriented in one attitude with respect to ring member M in access to ring R1 (as in FIG. 11), and with the hook oriented substantially at right angles to the first orientation, for access to ring portion R2 (FIG. 12).

With the hook thus installed on ring R2, it can then be oriented to a normal use attitude (as shown in broken lines in FIGS. 4 and 13 and in solid lines in FIGS. 1 and 2), in which position it will be apparent that inadvertent disengagement of the hook H from its position within ring R2 is prevented by both access segment 36, 38, 40, 42 and by access segment 26, 28, 30, 32, 34.

With hook H and ring portion R2 connected as shown in FIGS. 1 and 2, for example, the inner hook area 12 loosely accommodates ring portion R2. When either the chain connected to hook H or the line C connected to ring member M is loaded, putting the coupling in tension, hook-to-ring contact is made, and it occurs within the line of pull, such line of pull extending through the coupling in a straight line between eye portion 10 of hook H and eye portion 11 of ring member M. The same situation is true when hook H is engaged within ring portion R1 (as shown in FIGS. 3 and 4), i.e. regardless of which of the ring portions the hook H is engaged in, hook-to-ring contact is made in the line of pull.

FIGS. 5 and 6 show the hook and eye ring coupling which is the subject mater of the aforementioned copending application, which coupling includes a hook H identical in construction to the hook of the present invention and an elongated double-ring member M' characterized by an inboard first ring portion R1' and an outboard second ring portion R2', both of which are axially aligned with an eye portion 11' for the reception and accommodation of a clevis S2, or the like. FIG. 5 shows that when hook H is engaged within outboard ring portion R2 and the coupling is under tension, hook-to-ring contact is made in the line of pull. FIG. 6 shows the situation existing when hook H is engaged within inboard ring portion R1' and the coupling is under tension. In this situation line C pulling eye portion 11' of ring member M' in one direciton and chain pulling eye portion 10 of hook H in the opposite direction tend to straighten out the coupling and locate the point of contact of hook H with the inner surface of ring portion R1' within the line of pull extending through the coupling. However, this is prevented by the fact that the inner hook area 12 (not visible in FIG. 6) is not large enough to accommodate outboard ring portion R2'. Consequently, hook-to-ring contact is made at a location laterally offset to one side of the line of pull, creating a bending moment which acts on both the hook H and the ring member M' and tends to deform them. Such deformation is more likely to occur in hook H because it has the shallowest depth in the direction of bending and consequently a smaller section modulus available to resist bending. Due to the unique construction of the multiple-ring member of the present invention, the situation illustrated by FIG. 6 does not occur when the hook H is in use accidentally engaged or inadvertently left within the first ring portion R1.

FIG. 7 shows a slightly modified form of double-ring member wherein the centers of ring portions R1, R2 and eye portion 11 occupy the respective corners of an imaginary right angle triangle and the ring member M is itself substantially in the shape of a right angle triangle with rounded corners. Notwithstanding the slight change in opening arrangement, hook-to-ring contact still occurs within the line of pull regardless of which ring portion the hook is engaged in. The three openings may also be arranged to form an isosceles triangle. Also, ring member M could be provided with three or more ring portions and such ring portions either be spaced apart along an arc centered at eye portion 11 or such ring portions could be spaced apart along a straight line which is extending laterally from the eye portion 11.

The foregoing is considered as being merely illustrative and therefore not limitive as to the various structural forms the invention may take, consistent with the principles thereof above discussed. Since changes, variations, and modifications in the form, construction and the arrangement of the elements shown and described may be had without departing from the spirit of the invention, it is to be understood that the invention is to be limited solely by the scope of the appended claims, rather than by the specific details presented by the illustrative forms and foregoing descrpition.

Having thus described the invention, what I claim is:

1. A hook and ring coupling of the connect-disconnect type comprising a coupling hook and a multiple-ring member, said coupling hook having an inner hook area and a hook point opposed by a hook shoulder providing an access throat therebetween, said multiple-ring member having an eye portion receiving and loosely accommodating means for connecting said ring member to a tension member, said multiple-ring member also having a plurality of ring portions radially spaced from said eye portion in different radial directions, one of said ring portions having an outboard access segment dimensioned to snugly interfit the throat of the hook, said ring member further comprising an access segment between each adjacent ring portion which is also dimensioned to snugly interfit the hook throat, and said ring portions being thicker than the hook throat is wide excepting at the access segments.

2. A hook and ring coupling according to claim 1, wherein the outboard access segment and the hook throat are both configured to have snugly interfitting, substantially right angularly related access surfaces, substantially alignable in a plane across the direction of coupling and decoupling movement thereof.

3. A hook and ring coupling according to claim 1, wherein the interior surfaces of the hook point and hook shoulder present coplanar lock surfaces preventing disengagement of the hook from the ring except when a precise orientation of the hook with respect to said outboard access segment occurs.

4. A hook and ring coupling of the connect-disconnect type comprising a coupling hook and a multiple-ring member, said coupling hook having an inner hook area and a square cornered point opposed by a square cornered shoulder providing an access throat therebetween, said multiple-ring member having an eye portion receiving and loosely accommodating means for connecting said ring member to a tension member, said multiple-ring member also having a plurality of ring portions radially spaced from said eye portion in different radial directions from said eye portion, one of said ring portions having an outboard access segment dimensioned to snugly interfit the throat of the hook, said ring member further comprising an access segment between each adjacent ring portion which is also dimensioned to snugly interfit the hook throat, and said ring portions being thicker than the hook throat is wide excepting at the access segments.

5. A hook and ring coupling of the connect-disconnect type comprising a coupling hook and a double-ring member, said coupling hook having an inner hook area and a hook point opposed by a hook shoulder providing an access throat therebetween, said double-ring member having an eye portion receiving and loosely accommodating means for connecting said ring member to a line or the like, such ring member also having first and second ring portions spaced apart within a common plane, with such plane being laterally spaced from said eye portion, with each of said ring portions being dimensioned to loosely accommodate the hook when engaged therein, with said first ring portion having a first access segment dimensioned to snugly interfit the throat of the hook, with said first ring portion also having a second access segment circumferentially spaced from said first access segment and extending between said first ring portion and the second ring portion, with said second access segment also being dimensioned to snugly interfit the hook throat, and said ring portions being thicker than the hook throat is wide excepting at the access segments.

6. A hook and ring coupling according to claim 5, wherein the ring coupling at the access segment of its first ring portion and wherein the hook throat are both configured to have snugly interfitting, substantially right angularly related access surfaces, substantially alignable in a plane across the direction of coupling and decoupling movement thereof.

7. A hook and ring coupling according to claim 5, wherein said hook point and said hook shoulder each have inwardly facing lock surfaces of substantial area preventing camming of the first access segment of the first ring portion into the hook throat, with such arrangement preventing disengagement of the hook from the first ring portion except when a precise orientation of the hook with respect to said first access segment occurs.

8. A double-ring member of the type to which a G-hook is connectible, comprising a shackle eye portion and first and second ring portions spaced from said shackle eye portion in different radial directions from said shackle eye, said first ring portion having an access segment dimensioned to snugly interfit the throat of a G-hook, said first ring portion also having a second access segment circumferentially spaced from said first access segment and extending between said first ring portion and said second ring portion, said second access segment also being dimensioned to snugly interfit the hook throat, and said ring portions being thicker than the hook throat is wide excepting at the access segments.

9. A hook and ring coupling of the connect-disconnect type comprising a coupling hook and a multiple-ring member, said coupling hook having an inner hook area and a square cornered hook point opposed by a square cornered hook shoulder providing an access throat therebetween, said multiple-ring member having a substantially triangular shape with rounded corners, such multiple-ring member also having openings situated radially inboard of each said rounded corner, with the rounded corner portions of said ring member having generally circular shaped cross-sections, with a first of said openings being an eye for the reception and accommodation of means for fastening said ring member to a line and the remaining two openings constituting ring portions for selectively receiving and accommodating the hook, with the first of said ring portions having an outboard access segment dimensioned to snugly interfit the throat of the hook, with said first ring portion also having an inboard access segment circumferentially spaced from said outboard access segment and extending between said first ring portion and said second ring portion, with said inboard access segment also being dimensioned to snugly interfit the hook throat, and said ring portions being thicker than the hook throat is wide excepting at the access segments.

10. A hook and ring coupling according to claim 9, wherein the ring member at the outboard access segment of its first ring portion, and wherein the hook throat are both configured to have snugly interfitting, substantially right angularly related access surfaces, substantially alignable in a plane across the direction of coupling and decoupling movement thereof.

References Cited in the file of this patent
UNITED STATES PATENTS

| | | |
|---|---|---|
| 111,007 | Sample | Jan. 17, 1871 |
| 532,321 | Gates | Jan. 8, 1895 |
| 615,827 | Febring | Dec. 13, 1898 |
| 1,229,244 | Eckert | June 12, 1917 |
| 1,546,430 | Blitz | July 21, 1925 |
| 1,585,336 | Feja | May 18, 1926 |
| 3,091,274 | Winkelspecht | May 28, 1963 |

FOREIGN PATENTS

| | | |
|---|---|---|
| 568,911 | France | Apr. 3, 1924 |
| 741,032 | France | Feb. 4, 1933 |
| 312,065 | Germany | Apr. 30, 1919 |
| 16,908 | Great Britain | Sept. 8, 1893 |